UNITED STATES PATENT OFFICE.

OSCAR GERLACH, OF DANVILLE, ILLINOIS.

METHOD OF MAKING INSULATING COMPOSITION.

1,381,118.  Specification of Letters Patent.  Patented June 14, 1921.

No Drawing.  Application filed June 22, 1917. Serial No. 176,277.

*To all whom it may concern:*

Be it known that I, OSCAR GERLACH, a subject of the Emperor of Germany, and a resident of the city of Danville, in the county of Vermilion and State of Illinois, have invented certain new and useful Improvements in Methods of Making Insulating Composition; and I do hereby declare that the following is a full, clear, and exact description of the same.

This invention relates to the formation and application of an insulation coating or covering for application particularly upon walls, such as furnace walls, although of course, well adapted for any other use wherein the insulation qualities of the coating are desirable. Silo-cel or infusorial earth, which is finely disintegrated silica, is well known and has been used as a filtering material, and recently, as a heat insulation material. Heretofore it has been used in the form of bricks or blocks, as well as in a powder form between two layers of bricks, such as fire brick and common brick. Its application, however, as a coating in the form of a plaster or mortar on the exterior of walls, such as furnace walls, has not been successful for the following reasons. If the silo-cel or infusorial earth is mixed with plain water and applied upon the wall, it will shrink, warp and peel off when applied to hot or cold surfaces. If used with an inorganic binder such as clay or lime, it loses part of its insulating qualities.

This invention relates to a treatment and process of application of the silo-cel or infusorial earth upon a wall or other surface to coat the same to form an insulation coating thereon in a manner to prevent the coating from warping, cracking or peeling when applied to hot or cold surfaces, and to preserve the heat insulating qualities and in fact increase the heat insulating qualities of the silo-cel in the new form as applied upon the surface. To accomplish these ends, I use two ingredients, one to cause the substance to adhere to the surface on which applied, and the other to prevent the plaster from shrinking or cracking during the process of drying.

For this purpose, I use an organic binder containing some glue or resin, and as a cheap and practical material for the purpose, I use condensed sulfite liquor, which is a by-product of paper pulp mills. Secondly, in order to prevent the substance as applied from shrinking or cracking during the process of drying, I use a material which keeps the mortar or plaster covering as porous or voluminous when in a dry state as when wet. This end is attained by producing an ebullition of gas in the material during the process of application and drying thereof. To attain this end, I mix or dissolve one or more carbonates in water, and put the solution in the mortar mixture which is to be applied as a coating on the wall, and then add one or more acids to decompose the salts to free carbonic gas, which bubbles through the whole mortar mass. While in this condition, the material is applied upon the surface to be coated.

In practising my invention, the silo-cel or infusorial earth is mixed with water to a thick paste, and diluted sulfite liquor is then added and thoroughly mixed therewith. A carbonate, such as ammonium carbonate, or a bicarbonate, such as sodium bicarbonate, is then dissolved in water and added to the mixture, after which an acid such as acetic diluted with water, is stirred into the mixture so that the same at this stage forms a thin paste substantially of a consistency that the paste will not run off a trowel. The material is then thrown upon the hot surface to be treated by means of a brush or trowel to give either a rough or smooth surface as desired. Owing to the ebullition of gas in the mixture due to the addition of the acetic acid and the influence of the hot surface, the material as it dries, is of an exceedingly porous nature because of the cells or spaces formed in the mass by the generation of the gas. It is desirable not to make too large a batch of the material at one time, in order that the entire batch may be applied during the ebullition of the gas. The heat from the hot surface, of course, aids in continuing the gas generation and serves to hasten drying of the material. Preferably I use the substances named in the following quantities:

100 pounds of silo-cel;
5 pounds of sulfite liquor;
3 ounces of ammonium carbonate;
½ pound of acetic acid.

It will of course be understood that in practice the solid substances forming part of the composition may be mixed in the proportions required before shipment, and the liquids, such as the sulfite liquor, acetic acid and the water may be added in the desired quantities on the job.

There are many other salts and acids that can be used to produce the same results, but I have selected the ammonium carbonate and acetic acid for the reason that both are cheap commercial products, and a comparatively low degree of heat is needed to affect the gas generation desired. However, it is obvious that any ingredient that will produce the ebullition of gas to form a solid cellular structure will answer my purpose. I have merely set forth the ingredients that I prefer to use, and do not contemplate limiting the invention to the particular ingredients named.

I claim as my invention:

1. The method of making an insulating composition including mixing infusorial earth with water to form a thick paste, adding dilute sulfite liquor, then stirring a solution of ammonium carbonate thereinto and finally adding and stirring into the mixture acetic acid diluted with water.

2. A method of making an insulating composition including mixing infusorial earth with water to form a thick paste, adding diluted sulfite liquor and mixing the same into the paste, then adding a carbonate dissolved in water to the batch, and finally adding an acid to cause an ebullition of gas by reacting with the carbonate.

3. The method of making an insulating composition including mixing 100 pounds of infusorial earth with water, adding 5 pounds of sulfite liquor thereto, adding 3 ounces of ammonium carbonate in solution to the mixture, and stirring ½ pound of acetic acid thereinto to form a pasty mass of a consistency such that it will not run off a trowel.

4. The method of making an insulating composition including mixing infusorial earth with water to form a paste, incorporating a binder therewith, then adding separately solutions of a carbonate and a weakly dissociated acid to generate gas through the mass.

In testimony whereof I have hereunto subscribed my name in the presence of two subscribing witnesses.

OSCAR GERLACH.

Witnesses:
 CARL SCHERMAYER,
 EARL O. SIDDENS.